(12) United States Patent
Reeves et al.

(10) Patent No.: US 8,265,595 B1
(45) Date of Patent: Sep. 11, 2012

(54) MANAGING APPLICATION PERMISSIONS ON A MOBILE DEVICE

(75) Inventors: Raymond Emilio Reeves, Olathe, KS (US); Michael P. McMullen, Leawood, KS (US); Ryan Alan Wick, Punta Gorda, FL (US); Rodney D. Nelson, Overland Park, KS (US); John Marvin Jones, III, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 896 days.

(21) Appl. No.: 12/362,597

(22) Filed: Jan. 30, 2009

(51) Int. Cl.
 *H04M 11/00* (2006.01)
(52) U.S. Cl. ........................ 455/410; 455/411
(58) Field of Classification Search .................. 455/410, 455/411
 See application file for complete search history.

(56) References Cited

U.S. PATENT DOCUMENTS

| | | | |
|---|---|---|---|
| 2002/0173317 A1* | 11/2002 | Nykanen et al. | 455/456 |
| 2004/0171380 A1* | 9/2004 | Puranik et al. | 455/423 |
| 2004/0176104 A1* | 9/2004 | Arcens | 455/456.3 |
| 2006/0141985 A1* | 6/2006 | Patel et al. | 455/410 |

* cited by examiner

*Primary Examiner* — Marisol Figueroa

(57) ABSTRACT

A method for managing and tracking a permission status for an application on a mobile device is provided. The privacy policy on a mobile device may require users to grant permission for an application to access certain capabilities (e.g., GPS, personal information manager) on the mobile device. The user may be presented an interface on the mobile device that allows the user to grant an application permission to access the capability. When the user grants an application permission to access a capability a message is sent to a remote privacy manager that tracks the permission status of applications on the mobile device. The user may view the permission status of each application through the Internet. The user may also use the privacy manager to remotely change the permissions on the mobile device.

20 Claims, 6 Drawing Sheets

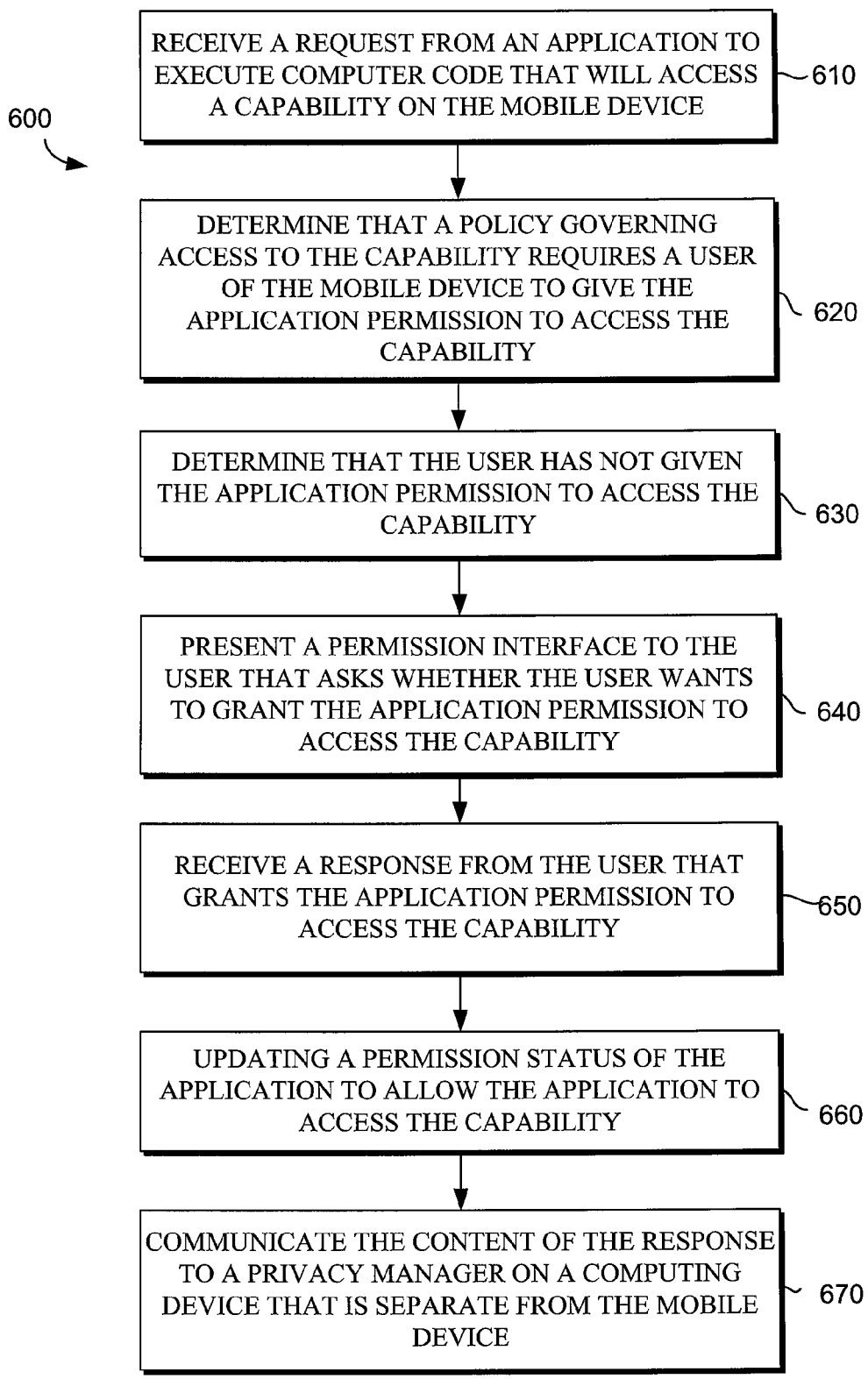

MANAGING APPLICATION PERMISSIONS ON A MOBILE DEVICE

SUMMARY

Embodiments of the invention are defined by the claims below, not this summary. A high-level overview of various aspects of the invention are provided here for that reason, to provide an overview of the disclosure and to introduce a selection of concepts that are further described below in the Detailed-Description section. This Summary is not intended to identify key features or essential features of the claimed subject matter, nor is it intended to be used as an aid in isolation to determine the scope of the claimed subject matter.

In a first illustrative embodiment, one or more computer-readable media having computer-executable instructions embodied thereon that, when executed, causes a mobile device to perform a method of tracking application permissions granted to applications running on the mobile device is provided. The method includes receiving, at the mobile device, notice that an application received a grant of permission to access a capability on the mobile device. The capability is protected, such that it is accessible by the application only after receiving the grant of permission. The capability includes a function that the mobile device was to potentially perform upon receiving a request from the application to perform the function. The application is installed on the mobile device. The generating a permission-status message that includes information describing the grant of permission. The method also includes communicating the permission-status message over a wireless interface to a privacy manager that records permission statuses for the applications running on the mobile device, wherein the privacy manager operates on a computing device that is separate from the mobile device, thereby creating a remote record of the grant of permission that is accessible through the privacy manager.

In another illustrative embodiment, one or more computer-readable media having computer-executable instructions embodied thereon that, when executed, causes the computing device to perform a method of remotely managing and tracking application permissions for applications installed on a mobile device is provided. The method includes receiving, at the computing device, a permission-status message from the mobile device that includes information describing a change in permission status for an application on the mobile device. The permission status is used by the mobile device to determine whether the application may be given access to a capability on the mobile device. The permission-status message includes a unique identifier for the mobile device. The method also includes storing the information related to the change in the permission status in a data store in association with the unique identifier, thereby allowing a current permission status for the application to be tracked independently of the mobile device. The method includes receiving a request to retrieve the current permission status for the application from the data store and communicating the current permission status for the application.

In a third illustrative embodiment, one or more computer-readable media having computer-executable instructions embodied thereon that, when executed, causes the mobile device to perform a method of managing application permissions on a mobile device is provided. The method includes receiving a request from an application to execute computer code that will access a capability on the mobile device. The method further includes determining that a policy governing access to the capability requires a user of the mobile device to give the application permission to access the capability and determining that the user has not given the application permission to access the capability. The method also includes presenting a permission interface to the user that asks whether the user wants to grant the application permission to access the capability. The method also includes receiving a response from the user that grants the application permission to access the capability and updating a permission status of the application to allow the application to access the capability. The method further includes communicating the content of the response to a privacy manager on a computing device that is separate from the mobile device.

BRIEF DESCRIPTION OF THE SEVERAL VIEWS OF THE DRAWINGS

Illustrative embodiments of the present invention are described in detail below with reference to the included drawing figures, wherein:

FIG. 6 is a flow chart of a method of managing application permissions on a mobile device, in accordance with an embodiment of the present invention.

DETAILED DESCRIPTION

Figure 1:
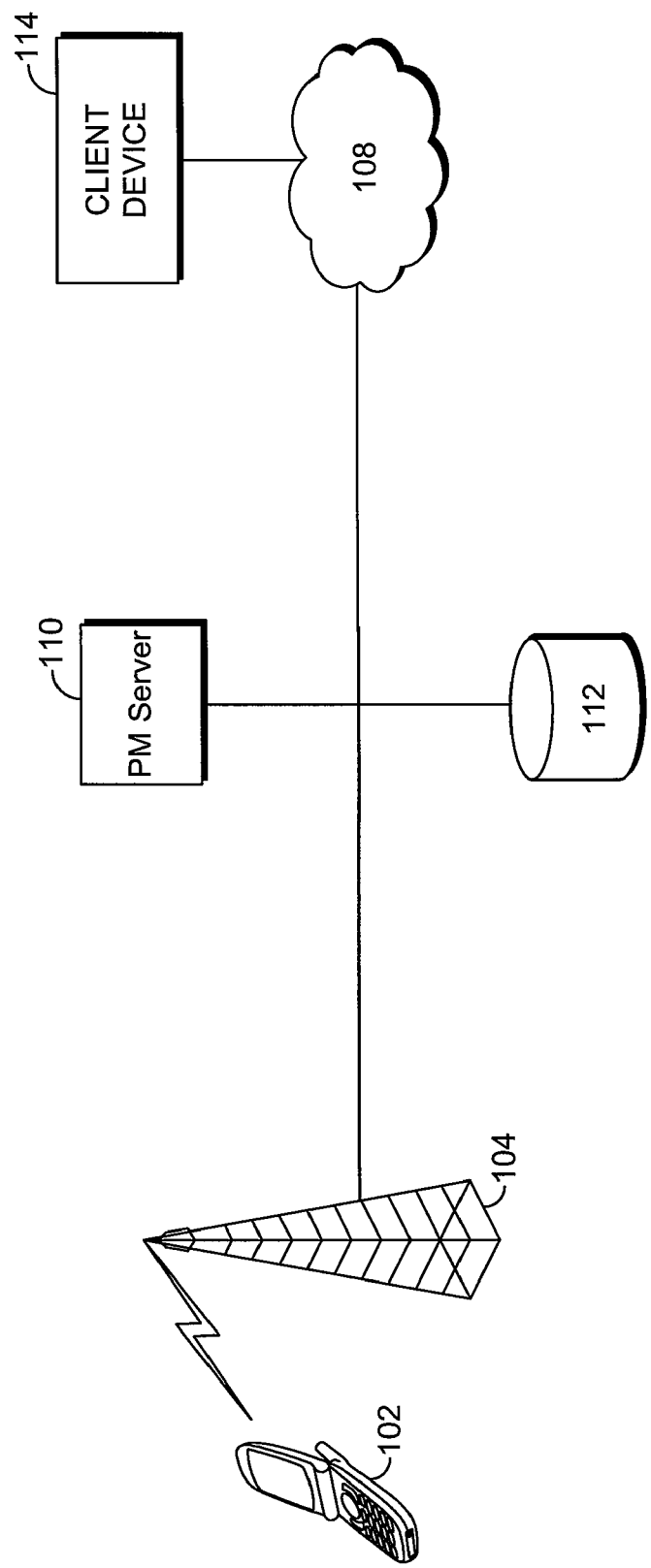
FIG. 1 is a drawing of an illustrative environment in which an embodiment of the present invention may operate.

Embodiments of the present invention provide systems and methods for managing the application permissions on a mobile device. The privacy policy on a mobile device may require the user of the mobile device to grant an application permission to access certain capabilities on the mobile device. For example, the user may need to grant an application permission to access GPS capabilities on the mobile device. Embodiments of the present invention allow grants of permission to be remotely tracked by a privacy manager that receives information from the mobile device when a grant of permission is given to an application. Denials of permission or any change in the permission status of an application may be tracked by the privacy manager, which may reside on a computing device that is separate from the mobile device. The privacy manager may display the permission status for applications on the mobile device to a person that requests the information. In addition, the user of a mobile device may change the permission status for applications on their mobile device using the privacy manager.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention.

| | |
|---|---|
| API | Application Interface |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GSM | Global System for Mobile-communications |
| LAN | Local Access Network |
| PDA | Personal Digital Assistant |
| PDSN | Packet Data Serving Node/Home Agent |
| RAM | Random Access Memory |
| ROM | Read Only Memory |
| SMS | Short Messaging Service |
| SMSC | Short Messaging Service Center |
| SIP | Session Initiation Protocol |
| TDMA | Time Division Multiple Access |

Embodiments of the present invention may be embodied as, among other things: a method, system, or computer-program product. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Illustrative Operating Environment

Embodiments of the present invention may be practiced in a communications network providing service to devices communicatively coupled to the communications network. An illustrative operating environment 100 that contains a few of the components within such a communications network is shown in FIG. 1. Illustrative operating environment 100 includes mobile device 102, base station 104, network 108, privacy-management server 110, data store 112, and client device 114. The components shown in FIG. 1 are a few of the components that embodiments of the invention may interact with during operation. The components shown in FIG. 1 are described in brief and with an emphasis on function for the sake of simplicity. The components within FIG. 1 are communicatively coupled to each other in a manner appropriate for carrying out their respective function within the illustrative operating environment 100. Embodiments of the present invention are not limited by the communication protocols or formats used to facilitate communications between components; those mentioned are for the sake of enablement and not meant to be limiting.

Mobile device 102 is depicted as a wireless communications device communicating over an air interface with base station 104. Mobile device 102 is a wireless terminal that is adapted to receive communications and media over the wireless networks included in illustrative operating environment 100. Some lower-level details of mobile device 102 are not shown so as to not obscure embodiments of the present invention. For example, mobile device 102 may include a bus that directly or indirectly couples the following devices: memory; one or more processors; one or more presentation components such as a display or speaker; input/output (I/O) ports; I/O components; and a power supply such as a battery. Mobile device 102 may communicate via wireless protocols, such as code division multiple access ("CDMA"), global system for mobile communications ("GSM"), or time division multiple access ("TDMA"), as well as others, to communicate with base station 104.

Mobile device 102 may take on any of a variety of forms. By way of example, mobile device 102 may be a mobile telephone, smart phone, laptop computing device, desktop computing device, server, personal digital assistant ("PDA") or any combination of these or other devices. Mobile device 102 is capable of receiving one or more forms of textual communications. Examples of communications that may be received include text messages, multimedia messages, emails, calendar updates, and task reminders.

The mobile device 102 may be associated with a user. For example, a text message sent to mobile device 102 would be intended for the user. The user is the ultimate recipient of communications (e.g., emails, phone calls, text messages) and media content sent to mobile device 102.

The mobile device 102 may be capable of executing computer applications. For example, the mobile device 102 may be able to execute JAVA applications that perform various functions. An application may access various capabilities of a mobile device, such as GPS location capabilities and contact information capabilities. The applications on the mobile device may be managed by an application manager. The application manager may check a policy file before allowing an application to execute code that would access Application Interfaces ("APIs") associated with certain capabilities on the mobile device.

The policy file may require a user to explicitly give an application permission to access a capability. Capabilities that require user permission to access are described as restricted capabilities throughout this disclosure. Upon determining that the policy file requires user permission to access a restricted capability, the application manager may present an opt-in screen that allows the user to give permission. A user could give a perpetual permission to an application that would allow the application to access the restricted capabilities until the perpetual permission is revoked. The user could also give a single-use permission, which allows the application to access the capability a single time. When single-use permission is given, the user's permission would need to be sought the next time the application seeks to access the capability. In some cases, a service provider may designate certain capabilities as restricted.

Base station 104 is a fixed station used for communicating with mobile device 102. Standard air interface protocols, such as code division multiple access ("CDMA"), global system for mobile communications ("GSM"), or time division multiple access ("TDMA"), as well as others, may be used by base station 104 to communicate with mobile device 102. Other network communications interface arrangements are also possible. A base station controller (not shown) is responsible for handling traffic and signaling with mobile device 102. Only one base station 104 is shown, and without its many components, for the sake of clarity. Mobile device 102 could be in simultaneous communication with multiple base stations.

Network 108 may include one or more mobile networks, one or more packet-based networks, including the Internet, and the public switched telephone network ("PSTN"). The various components within network 108 may be owned and/ or operated by multiple entities, commercial or otherwise. Network 108 is configured to transmit a variety of communication formats including phone calls, emails, text messaging, faxes, instant messaging, pages, voice mails, photographs, audio files, movies, TV shows, calendar reminders, task reminders and other files containing communicative content.

Privacy-management server 110 tracks the permission status of applications on mobile devices, displays the permission status of applications to requesting users, and allows users to remotely update the permission status for applications on their mobile device. The privacy-management server 110 may communicate with mobile devices using SMS messages, an HTTP connection, or any other suitable form of communication. The privacy-management server 110 is a combination of hardware and software. The hardware aspect includes a computing device that includes a CPU, short-term memory, long-term memory, and one or more network interfaces. A network interface is used to connect to a LAN, WAN (including the Internet), or other variety of communication network, such as network 108. The network interface to the WAN or LAN could be wired, wireless, or both. Software allows the privacy-management server 110 to communicate with mobile devices. The software also allows the privacy-management server to communicate with client devices, such as personal computers. The software may provide security authentication functions before allowing a user to access application permissions. The functions of the privacy-management server 110 will be explained in more detail subsequently.

Data store 112 may store information related to the permission status of applications on a plurality of mobile devices. For example, the data store 112 may store which capabilities on a mobile device an application has permission to access. The data store 112 may also store the dates on which grants of permission were given or revoked. The data store 112 may also store a list of applications installed on each mobile device and the associated permission statuses for each application. The data store 112 may be accessed by one or more components including the privacy-management server 110. Data store 112 may store the permission status information in any number of data structures including a relational database.

Client device 114 is a combination of hardware and software for communicating with other computing devices. The hardware aspect includes a computing device that includes a CPU, short-term memory, long-term memory, and one or more network interfaces. A network interface is used to connect to a LAN, WAN (including the Internet), or other variety of communication network, such as network 108. The network interface to the WAN or LAN could be wired, wireless, or both. Software allows the client device 114 to communicate with other computers connected to a common network through the network interface. The software facilitates communications with other computing devices. In one embodiment, the software allows the client device 108 to access information in the privacy-management server 110. The client device 114 may have one or more display devices for present displaying information to the user. The above description of hardware and software is illustrative only; many other features of the client device 114 were not listed so as to not obscure embodiments of the present invention.

Figure 2:
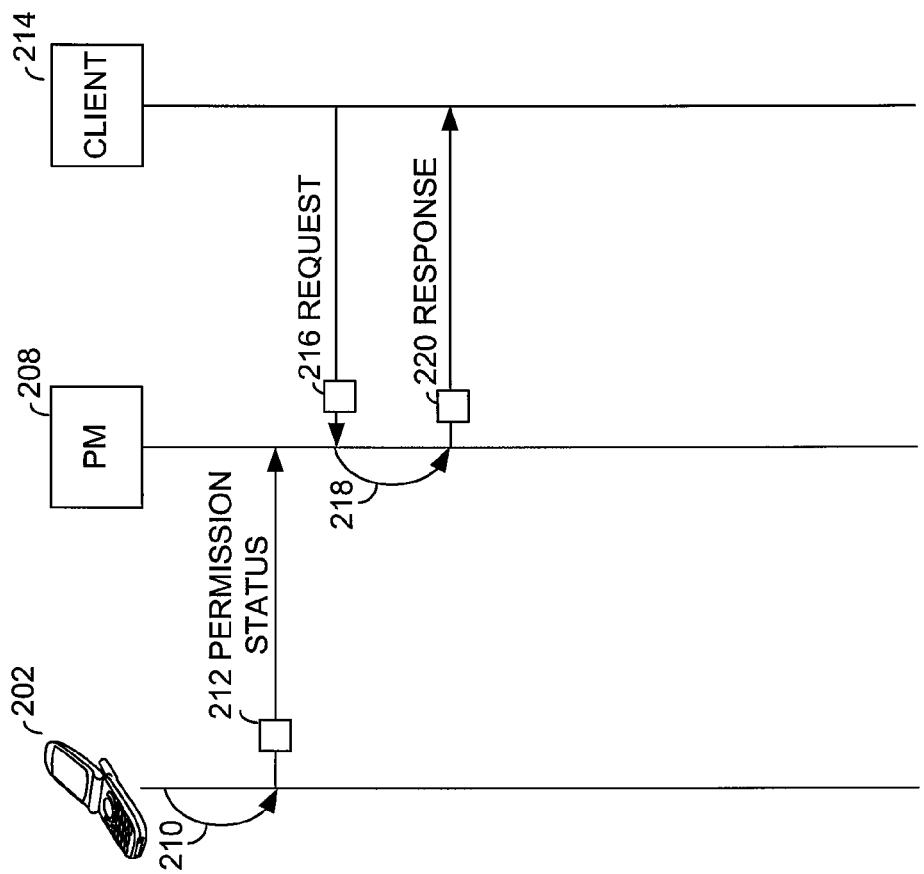
FIG. 2 is a drawing illustrating communications occurring while tracking permission statuses for applications on a mobile device, in accordance with an embodiment of the present invention.

Turning now to FIG. 2, communications occurring while tracking permission statuses for applications on a mobile device are illustrated, according to an embodiment of the present invention. Mobile device 202 may be similar to mobile device 102 described previously with reference to FIG. 1. Privacy manager 208 may be similar to the privacy-management server 110 described previously with reference to FIG. 1. Client device 214 may be similar to client device 114 described previously with reference to FIG. 1.

Initially a grant of permission 210 for an application to access a capability on the mobile device 202 is received. The grant of permission 210 may be received in response to an application-management system determining that the application has not yet received permission from the user to access the capability. The application-management system may provide an opt-in interface for the user to grant permission. The interface may be displayed on the mobile device.

Upon receiving the grant of permission 210, the mobile device 202 generates a permission-status message 212 that is sent to privacy manager 208. Permission-status message 212 may be an SMS message, or any other suitable form of communication. The permission-status message 212 includes a unique identifier for the mobile device 202. Other information describing, or related to, the grant of permission 210 may be included in the permission-status message 212. For example, permission-status message 212 may include the name of the application granted permission, a description of the capability accessed, the date and time the grant of permission 210 was given, user information, and any other pertinent information related to the grant of permission 210.

Upon receiving the permission-status message 212, privacy manager 208 stores the information communicated in the message. The information is stored with a unique identifier that allows the privacy manager 208 to correlate the information with mobile device 202.

Information stored in the privacy manager 208 may be retrieved by client device 214. In one embodiment, the client device 214 connects to privacy manager 208 over the Internet. Initially, a request 216 to provide the permission status for one or more applications on the mobile device 202 is sent from the client device 214 to the privacy manager 208. Upon receiving the request 216, the privacy manager 208 retrieves 218 the requested information. The privacy manager 208 may require validation to retrieve the information. The information requested is then communicated in a response 220 that is sent from the privacy manager 208 to the client device 214. The response 220 may include the names of applications installed on the mobile device 202 and associated permission statuses for each application. The permission statuses may include whether the application presently has permission to access one or more capabilities. If permission was granted, the permission statuses may also include the date and time when the permission was given.

Figure 3:
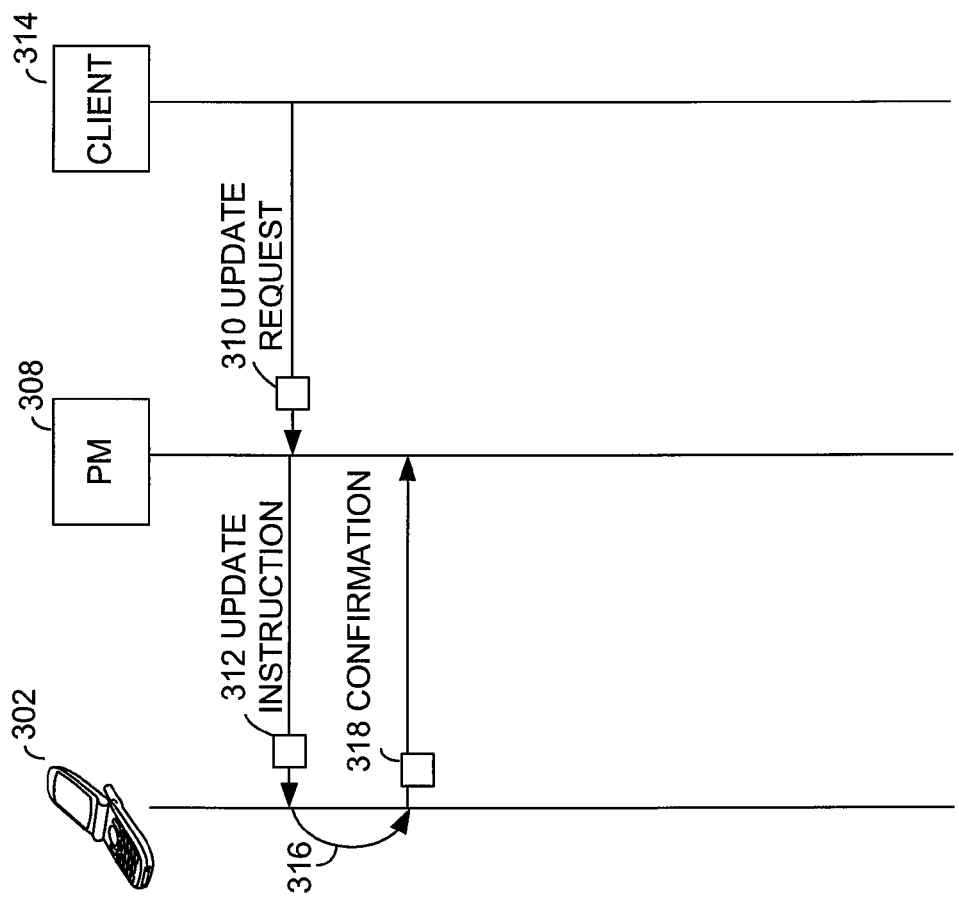
FIG. 3 is a drawing illustrating communications occurring while remotely updating the permission status for an application on a mobile device, in accordance with an embodiment of the present invention.

Turning now to FIG. 3, communications occurring while remotely updating the permission status for an application on a mobile device are shown, in accordance with an embodiment of the present invention. Mobile device 302 may be similar to mobile device 102 described previously with reference to FIG. 1. Privacy manager 308 may be similar to the privacy-management server 110 described previously with reference to FIG. 1. Similarly, the client device 314 may be similar to the client device 114 described previously with reference to FIG. 1.

Initially, update request 310 is sent from client device 314 to privacy manager 308. The client device 314 may generate update request 310 in response to input from a user. In one embodiment, the user generates the update request 310 through a user interface provided by the privacy manager 308 and displayed on the client device 314. Update request 310 may include a unique identifier for the mobile device 302, the name or identification information for an application whose permission status is to be updated, and validation information for the privacy manager 308 and/or the mobile device 302. This list of information is not meant to be exhaustive.

The privacy manager 308 receives the update request 310 and generates an update instruction 312. The update instruction 312 is sent to the mobile device 302. The update instruction 312 instructs the mobile device to change the permission status for one or more applications on the mobile device 302. As described previously, the permission status allows the application to access a capability on the mobile device 302. Upon receiving the update instruction 312, the mobile device 302 updates 316 the permission status according to the directions in the update instruction 312. The mobile device 302 may then send a confirmation message 318 to the privacy manager 308 indicating that the permission status has been updated. The new permission status may then be recorded by the privacy manager 308.

Figure 4:
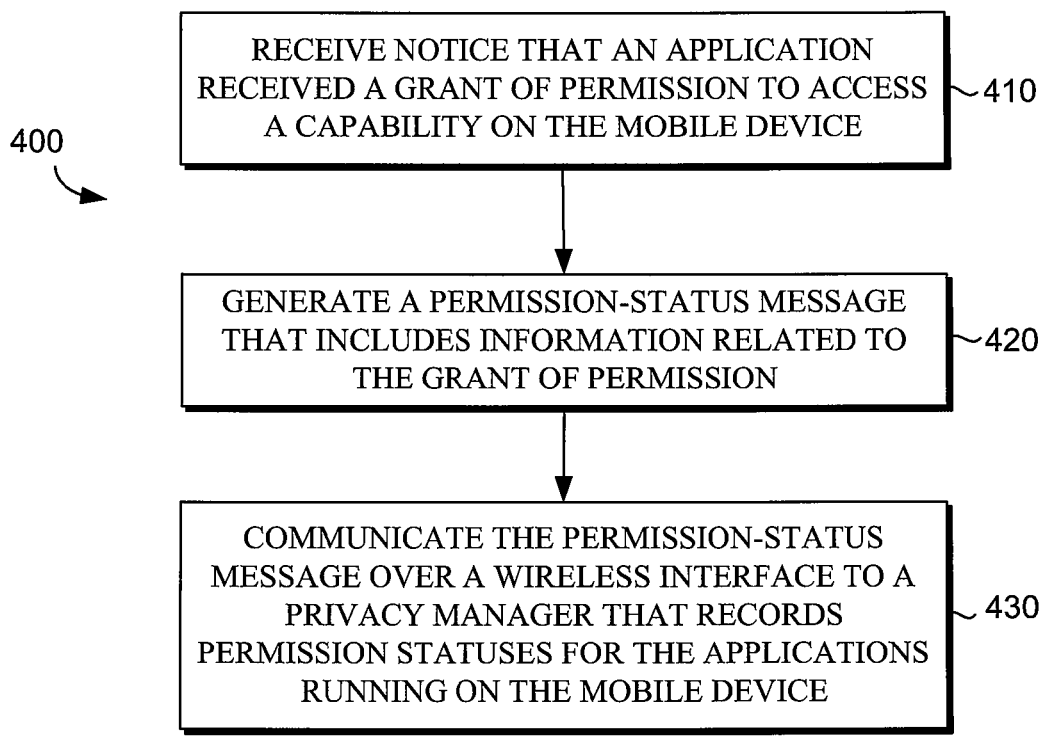
FIG. 4 is a flow chart showing a method of tracking application permissions granted to applications running on a mobile device, in accordance with an embodiment of the present invention.

Turning now to FIG. 4, a method of remotely tracking application permissions granted to applications running on a mobile device is shown, in accordance with an embodiment of the present invention. The mobile device may be similar to the mobile device 102 described with reference to FIG. 1. The applications may be programmed in any language compatible with the operating system running on the mobile device. In one embodiment, the applications are written in Java. An application's access to certain capabilities on the mobile device may be governed by a privacy policy. The privacy policy may require the user to give permission to applications to access a capability on the mobile device.

The privacy policy may be enforced by an application management system running on the mobile device. The application management system may determine whether an application may access a capability on the mobile device prior to the application executing a portion of code that accesses the capability. Before the capability is accessed, the application management system may check with the privacy policy to determine what type of permission is needed to access the capability. The application management system may also determine whether the application has previously been given permission to access the capability. Whether the application currently has permission to access to the capability is referred to as the application's permission status. When the application management system determines that permission has not been granted, a user interface may be displayed to allow the user to grant the application permission to access the capability. The opt-in user interface may include the name of the application and the capability the application is seeking to access. Other pertinent information may also be included in the opt-in interface.

In one embodiment, a blanket permission is given that allows an application to access all capabilities on the mobile device. In another embodiment, the user gives an application permission to access capabilities on a per-capability basis. Permission may be granted by the user on a one-time basis or perpetually. Perpetual permission allows the application to access the capability until the user revokes the grant of permission. A one-time grant of permission allows the application to access the capability one time. The application would need to seek permission to access the capability each time the capability is accessed.

At step 410, notice that an application is given a grant of permission to access a capability on the mobile device is received. The capability is a function the mobile device can perform. Examples of capabilities include a geographic location capability, personal information management capability, network connectivity capability, and user information capabilities. As described previously, the grant of permission may have been given through an opt-in user interface. Notice may be provided by the application management system.

At step 420, a permission-status message is generated. The permission-status message includes information related to the grant of permission. Specifically, the permission-status message may include the name of the application to which permission was granted, the capability to which permission was granted, and other information describing the application or capability. In addition, the date on which the user granted permission may be included in the permission-status message.

At step 430, the permission-status message is communicated over a wireless interface to a privacy manager that records permission statuses for the applications running on the mobile device. The privacy manager receives the message and records information from the message in a data store. The privacy manager allows the permission status of application to be tracked remotely. The information describing the grant of permission may also be stored in a data store within the mobile device.

Figure 5:
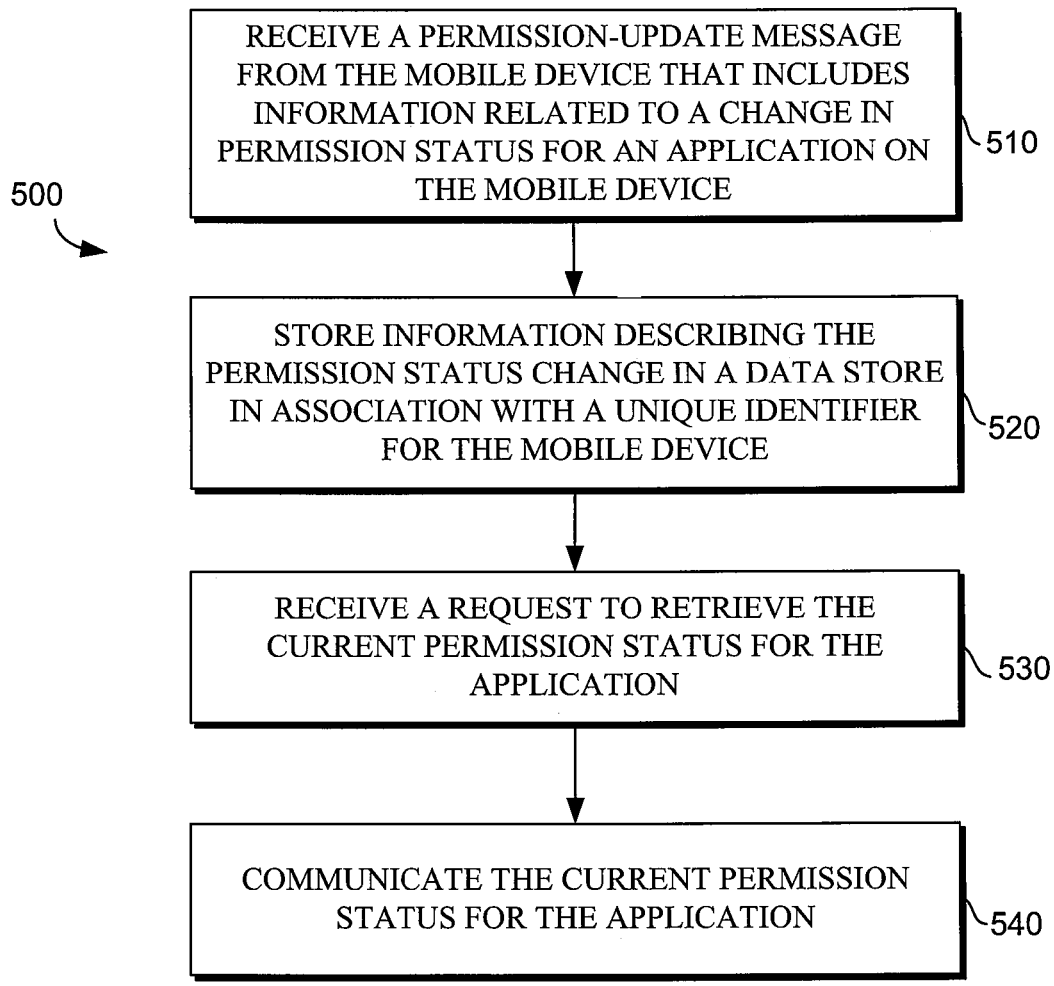
FIG. 5 is a flow chart showing a method of remotely managing and tracking application permissions for applications installed on a mobile device, in accordance with an embodiment of the present invention.

Turning now to FIG. 5, a method of remotely managing and tracking application permissions for applications installed by a mobile device is shown, in accordance with an embodiment of the present invention. At step 510, the permission-update message is received from the mobile device. The permission-update message includes information describing a change in permission status for an application on the mobile device. As described previously, the permission status is used by the mobile device to determine whether the application may be given access to a capability on the mobile device. The permission-update message includes a unique identifier for the mobile device and information describing the application and capability involved in the change in permission status. In addition, the date of the change in permission status may also be included in the permission-update message.

At step 520, the information related to the change in permission status is stored. The information may be stored in a data store in association with the unique identifier. This allows the change in application status to be associated with the mobile device on which the change in status was made. The information describing the change in permission status may be stored so that the permission status of the individual application on a particular mobile device may be retrieved upon request.

At step 530, a request to retrieve the current permission status for the application is received. In response to the request, the current permission status is retrieved. At step 540, the current permission status for the application is communicated to the requesting party.

Turning now to FIG. 6, a method of managing application permissions on a mobile device is shown, in accordance with an embodiment of the present invention. At step 610, a request is received from an application to execute computer code that will access a capability on the mobile device. The request may be received by an application-management system responsible for controlling an application's access to capabilities on the mobile device. The request may call an application interface associated with the capability.

At step 620, a policy governing access to the capability is determined to require a user of the mobile device to give the application permission to access the capability. At step 630, the user is determined not to have given the application permission to access the capability. At step 640, a permission interface is presented to the user that asks whether the user wants to grant the application permission to access the capability. At step 650, a response is received from the user granting the application permission to access the capability. As described previously, the response may indicate that the grant of permission is perpetual or one-time only. In addition, the grant of permission may be a blanket permission to cover multiple capabilities or just a single capability.

At step 660, a permission status of the application is updated to allow the application access to the capability. At step 670, the content of the response is communicated to a privacy manager on a computing device that is separate from the mobile device. As described previously, the privacy manager may track the permission status for applications on the mobile device. The privacy manager stores the permission status of the application. This allows the permission status to be accessed when the mobile device is not available.

Many different arrangements of the various components depicted, as well as components not shown, are possible without departing from the spirit and scope of the present invention. Embodiments of the present invention have been described with the intent to be illustrative rather than restrictive. Certain features and subcombinations are of utility and may be employed without reference to other features and subcombinations and are contemplated to be within the scope of the claims. Not all steps listed in the various figures need be carried out in the specific order described.

The invention claimed is:

1. One or more non-transitory computer-readable media having computer-executable instructions embodied thereon that, when executed, causes a mobile device to perform a method of tracking application permissions granted to applications running on the mobile device, the method comprising:
   receiving, at the mobile device, notice that an application received a grant of permission to access a capability on the mobile device, wherein
   (1) the capability is protected by being accessible by the application only after receiving the grant of permission,
   (2) the capability includes a function that the mobile device was to potentially perform upon receiving a request from the application to perform the function, and
   (3) the application is installed on the mobile device;
   generating a permission-status message that includes information describing the grant of permission; and
   communicating the permission-status message over a wireless interface to a privacy manager that records permission statuses for the applications running on the mobile device, wherein the privacy manager operates on a computing device that is separate from the mobile device, thereby creating a remote record of the grant of permission that is accessible through the privacy manager.

2. The media of claim 1, wherein the method further includes storing the grant of permission in a data store on the mobile device.

3. The media of claim 1, wherein the method further includes:
   receiving a request to execute the application, wherein, when executed, the application will access the capability; and
   determining that a policy governing access to the capability requires a user of the mobile device to give the application permission to access the capability.

4. The media of claim 3, wherein the method further includes:
   presenting an opt-in user interface that asks the user of the mobile device to grant the application permission to access the capability; and
   wherein the grant of permission is received by the mobile device through the opt-in user interface.

5. The media of claim 1, wherein the capability is one or more of a locating capability that determines the mobile device's geographic location, a personal information manager that stores the user's contact information, and a connectivity function that stores network-connectivity information.

6. The media of claim 1, wherein the information related to the grant of permission includes one or more of a name of the application, a time when the grant of permission was given by a user, a description of the capability, and information describing an entity that created the application.

7. The media of claim 1, wherein the permission-status message is an SMS message.

8. One or more non-transitory computer-readable media having computer-executable instructions embodied thereon that, when executed, causes a computing device to perform a method of remotely managing and tracking application permissions for applications installed on a mobile device, the method comprising:
   receiving, at the computing device, a permission-status message from the mobile device that includes information describing a change in permission status for an application on the mobile device, wherein the permission status is used by the mobile device to determine whether the application is given access to a capability on the mobile device, and wherein the permission-status message includes a unique identifier for the mobile device;
   storing the information related to the change in the permission status in a data store in association with the unique identifier, thereby allowing a current permission status for the application to be tracked independently of the mobile device;
   receiving a request to retrieve the current permission status for the application from the data store; and
   communicating the current permission status for the application.

9. The media of claim 8, wherein the information related to the change in the permission status includes one or more of whether the permission status was changed to granted or denied, a name of the application, a time when the change in the permission status was made, a description of the capability, and information describing an entity that created the application.

10. The media of claim 8, wherein the unique identifier is a network access identifier associated with the mobile device.

11. The media of claim 8, wherein the method further includes:
   receiving an update request to change the permission status of the application, wherein the update request is received from a client device communicating over the Internet;
   generating an instruction to change the permission status of the application on the mobile device; and
   communicating the instruction to the mobile device.

12. The media of claim 11, wherein the method further includes:
   receiving an acknowledgement message from the mobile device indicating that the permission status of the application has been changed; and
   updating a record of the permission status for the application in the data store.

13. The media of claim 12, wherein the method further includes displaying a user interface for receiving the update request to change the permission status of the application.

14. One or more non-transitory computer-readable media having computer-executable instructions embodied thereon that, when executed, causes a mobile device to perform a method of managing application permissions on the mobile device, the method including:
- receiving a request from an application to execute computer code that will access a capability on the mobile device;
- determining that a policy governing access to the capability requires a user of the mobile device to give the application permission to access the capability;
- determining that the user has not given the application permission to access the capability;
- presenting a permission interface to the user that asks whether the user wants to grant the application permission to access the capability;
- receiving a response from the user that grants the application permission to access the capability;
- updating a permission status of the application to allow the application to access the capability; and
- communicating the content of the response to a privacy manager on a computing device that is separate from the mobile device, thereby allowing the permission status to be remotely recorded and accessed.

15. The media of claim 14, wherein the capability is one or more of a locating capability that determine the mobile device's geographic location, a personal information manager that stores the user's contact information, and a connectivity function that stores network-connectivity information.

16. The media of claim 14, wherein the mobile device includes at least protected capabilities and unprotected capabilities, wherein the protected capabilities require the user to grant the application permission to access a protected capability, and wherein the capability is the protected capability.

17. The media of claim 14, wherein the method further includes:
- receiving an update request from the privacy manager with instructions to change the permission status of the application for the capability; and
- changing the permission status of the application to conform to the request.

18. The media of claim 14, wherein the method further includes:
- receiving an additional request from the privacy manager to report the permission status of the application to access the capability; and
- communicating a message that includes a description of the permission status of the application to access the capability.

19. The media of claim 14, wherein the method of claim 14 is performed by an application management system installed on the mobile device.

20. The media of claim 14, wherein the content from the response includes one or more of a name of the application, a time when permission was granted by the user, a description of the capability, and information describing an entity that created the application.

* * * * *